US009685699B2

(12) United States Patent
Mahanfar et al.

(10) Patent No.: US 9,685,699 B2
(45) Date of Patent: Jun. 20, 2017

(54) INTEGRATED ANTENNA FOR WIRELESS COMMUNICATIONS AND WIRELESS CHARGING

(71) Applicants: Alireza Mahanfar, Bellevue, WA (US); Javier Rodriguez De Luis, Kirkland, WA (US); Benjamin Shewan, Redmond, WA (US); Rod G. Fleck, Bellevue, WA (US)

(72) Inventors: Alireza Mahanfar, Bellevue, WA (US); Javier Rodriguez De Luis, Kirkland, WA (US); Benjamin Shewan, Redmond, WA (US); Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 298 days.

(21) Appl. No.: 14/284,361

(22) Filed: May 21, 2014

(65) Prior Publication Data

US 2014/0347233 A1 Nov. 27, 2014

Related U.S. Application Data

(60) Provisional application No. 61/825,946, filed on May 21, 2013.

(51) Int. Cl.
*H02J 7/00* (2006.01)
*H01Q 1/52* (2006.01)
(Continued)

(52) U.S. Cl.
CPC ............. *H01Q 1/521* (2013.01); *H01Q 1/241* (2013.01); *H01Q 1/243* (2013.01); *H01Q 1/44* (2013.01); *H01Q 1/46* (2013.01)

(58) Field of Classification Search
USPC .......................................................... 320/108
See application file for complete search history.

(56) References Cited

U.S. PATENT DOCUMENTS 8,294,300 B2 10/2012 Cook et al.
8,655,272 B2 2/2014 Saunamäki
(Continued)

FOREIGN PATENT DOCUMENTS

WO WO 2010/035256 1/2010

OTHER PUBLICATIONS

Imura et al., "Study on Open and Short End Helical Antennas with Capacitor in Series of Wireless Power Transfer using Magnetic Resonant Couplings," *IECON Proceedings*, p. 3884-3889 (2009).
(Continued)

*Primary Examiner* — Robert Grant
(74) *Attorney, Agent, or Firm* — Klarquist Sparkman, LLP

(57) ABSTRACT

Antennas, antenna systems, and components used in antenna systems are provided herein. In various examples, an integrated antenna for receiving signals for a plurality of functional modules in a computing device may include a first plurality of antenna elements for receiving signals at wireless communication frequencies and a second plurality of antenna elements for receiving signals at wireless charging frequencies. The first and the second pluralities of antenna elements may have at least one common antenna element, which may be coupled to one or more of the second plurality of antenna elements using at least one low-pass filter. The at least one common antenna element is de-coupled from one or more of the plurality of functional modules operating at the wireless communication frequencies using at least one high-pass filter.

20 Claims, 7 Drawing Sheets

(51) Int. Cl.

| | |
|---|---|
| ***H01Q 1/24*** | (2006.01) |
| ***H01Q 1/44*** | (2006.01) |
| ***H01Q 1/46*** | (2006.01) |

(56) References Cited

U.S. PATENT DOCUMENTS

| | | | | |
|---|---|---|---|---|
| 2005/0127867 | A1 | 6/2005 | Calhoon et al. | |
| 2008/0272889 | A1 | 11/2008 | Symons | |
| 2011/0065383 | A1 | 3/2011 | Frankland et al. | |
| 2011/0217927 | A1 | 9/2011 | Ben-Shalom et al. | |
| 2012/0213885 | A1 | 8/2012 | Nishizawa et al. | |
| 2012/0235508 | A1* | 9/2012 | Ichikawa ................ | H02J 5/005 307/104 |
| 2012/0248891 | A1* | 10/2012 | Drennen ................. | H02J 5/005 307/104 |
| 2012/0299388 | A1 | 11/2012 | Gong | |
| 2013/0038278 | A1 | 2/2013 | Park et al. | |

OTHER PUBLICATIONS

Ollikainen et al., "Internal Dual-Band Patch Antenna for Mobile Phones," *Proc. AP2000 Millennium Conference on Antennas & Propagation*, Davos, Switzerland, p. 1111-1114 (Apr. 2000).

Spies et al., "Wireless Energy Transmission System for Low-Power Devices," *IEEE Sensors*, Lecce, Italy (Oct. 2008).

* cited by examiner

INTEGRATED ANTENNA FOR WIRELESS COMMUNICATIONS AND WIRELESS CHARGING

CROSS-REFERENCE TO RELATED APPLICATIONS/INCORPORATION BY REFERENCE

This application makes reference to, claims priority to, and claims the benefit of U.S. Provisional Application Ser. No. 61/825,946 (titled "Antenna Systems") filed on May 21, 2013. This provisional application is hereby incorporated herein by reference in its entirety.

FIELD

The present application relates generally to radio frequency (RF) communication, antennas, antenna systems, and multi-antenna systems.

BACKGROUND

Mobile computing devices have been widely adopted in recent years. Many functions previously performed primarily by personal computers, such as web browsing, streaming, and uploading/downloading of media are now commonly performed on mobile devices. Consumers continue to demand smaller, lighter devices with increased computing power and faster data rates to accomplish these tasks. Additionally, mobile devices increasingly need to support the large number of frequencies specified by the various communications standards, and therefore, larger number of antennas need to be supported.

The allocated space for one or more antennas is called antenna volume or antenna keepout. However, due to established theoretical limit on antenna performance based on antenna keepout, design of multiple antennas in a device would add to the overall size of the device, which may not be desirable. Another constraint in the device and antenna keepout design is the interaction (or coupling) between the different antennas. For example, coupling between two antennas causes problems such as interference, efficiency/gain degradation, and detuning, which would further complicate multi-antenna system design and configuration.

Multi-antenna configurations, including antenna diversity (diversity) configurations and multiple-input, multiple-output (MIMO) configurations, have been used in attempts to increase the quality and data rates within a constrained spectrum of wireless communications. Antenna diversity refers to configurations that transmit or receive multiple versions of a signal to increase the likelihood that the signal will be received without errors or noise. The principle behind diversity configurations is that circumstances that adversely affect one version of a signal may not affect another version of the signal. Diversity includes, for example, time diversity, in which a signal is transmitted/received at different times; frequency diversity, in which a signal is transmitted/received at different frequencies; spatial diversity, in which a signal is transmitted/received from/at different positions; and polarization diversity, in which a signal is transmitted/received at different polarizations. Diversity configurations of two receive antennas and one transmit antenna, for example, are possible. Other configurations including multiple transmitters and/or receivers are also possible and may be used in some embodiments.

Diversity alone, however, does not necessarily affect data rates. Rather than using multiple antennas only to provide an additional signal source to improve accuracy of a signal, MIMO systems increase data rates by using multiple antennas that act together to transmit more information. MIMO can include: multi-stream beam forming in which signals received at different antennas add constructively; spatial multiplexing in which each of a plurality of transmit antennas transmits a signal at the same frequency but using a lower data rate, and the transmit signals are combined on the receive end; and using multiple antennas to transmit orthogonally coded versions of a single bitstream at each of a plurality of antennas. MIMO can be viewed as a type of diversity. Even with the adoption of diversity and MIMO configurations, further advances are needed in antenna design and configuration.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an integrated antenna for receiving signals for a plurality of functional modules in a computing device may include a first plurality of antenna elements for receiving signals at wireless communication frequencies and a second plurality of antenna elements for receiving signals at wireless charging frequencies. The first and the second pluralities of antenna elements may have at least one common antenna element, which (when receiving wireless charging signals) may be coupled to one or more of the second plurality of antenna elements using at least one low-pass filter. The at least one common antenna element is (when receiving wireless charging signals) de-coupled from one or more of the plurality of functional modules operating at the wireless communication frequencies using at least one high-pass filter.

In accordance with one or more aspects, a mobile device may include a plurality of high-frequency antennas configured to receive signals at wireless communication frequencies and conductive material coupled to at least two of the plurality of high-frequency antennas to form a low-frequency antenna configured to receive signals at wireless charging frequencies or near-field communication (NFC) frequencies. The mobile device may further include isolation circuitry that is configured to de-couple the conductive material from one or more wireless communication transceivers coupled to the at least two of the plurality of high-frequency antennas at wireless communication frequencies. The isolation circuitry may be further configured to couple the conductive material to the at least two of the plurality of high-frequency antennas at wireless charging frequencies.

In accordance with one or more aspects, a mobile device may include a chassis, at least one high-frequency antenna configured to receive signals at wireless communication frequencies. The at least one high-frequency antenna may be coupled to the chassis via a first filter. The device may further include a wireless charging circuit configured to charge a battery of the mobile device using signals at wireless charging frequencies. The wireless charging circuit may be coupled to the chassis via a second filter. The at least one high-frequency antenna may be coupled to the wireless charging circuit via a third filter. The filters may include one or more bandpass filters, notch filters or other types of filters. The chassis, at least a portion of the at least one high-frequency antenna, and the first, second and third filters may form a wireless charging loop configured to receive the signals at wireless charging frequencies.

As described herein, a variety of other features and advantages can be incorporated into the technologies as desired.

DETAILED DESCRIPTION

Figure 1:
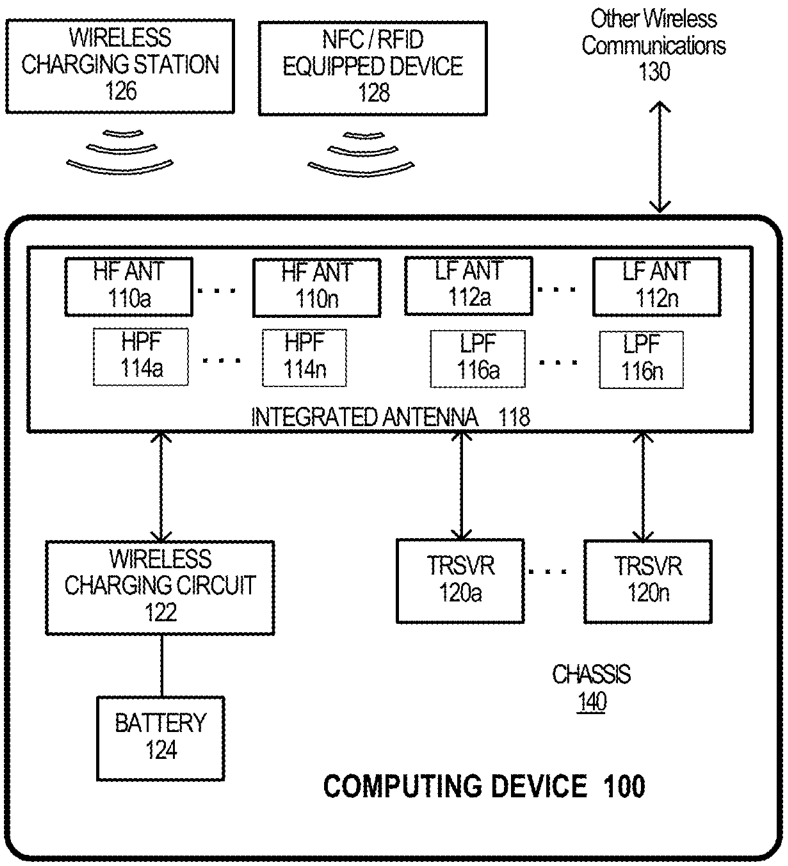
FIG. 1 is a block diagram illustrating a computing device using an integrated antenna with high-frequency elements, low-frequency elements, and isolation circuitry, in accordance with an example embodiment of the disclosure.

Examples described herein provide antennas and antenna systems, including integrated HF/LF antennas for wireless communications and wireless charging, as well as NFC/RFID communications. In some instances, a planar coil or loop may be used as antenna for wireless charging system, near-field communication (NFC) as well as radio-frequency identification (RFID). Additionally, the size of the coil may have certain size requirements and may need to be isolated from any other metallic components by absorber sheets. The absorber sheets often have signal degrading qualities. Furthermore, multiple antennas and coils in a portable wireless device may limit miniaturization and usability design.

Antennas can be modified to act as part of a wireless inductive charging coil. Wireless charging coils require space that could be used for other device structures, including additional antennas, or to make the device smaller, thinner, and lighter. An inductive charging coil can be created by connecting wire or other conductive material to one or more antennas in such a way as to form a loop. In this way, a portion of the charging coil serves another purpose (antenna or chassis), and the weight, space, and expense added by incorporating wireless charging is reduced.

Wireless charging typically operates at frequencies several orders of magnitude lower than frequencies used for wireless communication. For example, wireless charging circuits may operate at frequencies up to the hundreds of kilohertz, whereas wireless communication typically occurs at frequencies in the hundreds of megahertz or gigahertz range. The antenna or antennas that form part of the wireless charging coil can be isolated from the conductor that forms the remainder of the coil using low-pass filters (LPFs), such as one or more inductors or other types of filters such as notch filters, bandpass filters, band-reject filters, and so forth. The impedance of the inductors increases with frequency, tending to reduce electrical coupling between the antennas and the remainder of the charging coil at wireless communication frequencies. High-pass filters (HPFs), such as one or more capacitors or other type of filters, can be used to isolate (or de-couple) the transceiver radios from the wireless charging circuitry and the wireless charging loop if wireless charging signals are being processed. Switches can also be used in place of one or more of the LPFs and/or HPFs to selectively isolate the antennas or the transceiver circuitry from the charging coil. Other parts of a device could also be incorporated into a wireless charging circuit. For example, parts of the chassis and other metal structures could be used, as seen in, for example, FIGS. 5-6.

In accordance with example embodiments, high-frequency (HF) antennas associated with wireless systems (e.g., wireless systems operating at 704 MHz-5800 MHz range or 60 GHz or another wireless frequency range) may be combined with low-frequency (LF) antennas/transducer associated with wireless charging (both inductive coupling and resonant/capacitive coupling) as well as NFC/RFID communications (i.e., an integrated antenna). Filtering circuitry may be used at the terminals of each transceiver, and a current path may be formed using wires, traces or available metallic components or structure (e.g. metal chassis, metal housing of the device, or a printed circuit board (PCB)) with, for example, the following characteristics: (1) a radiator/antenna at the right resonant length and frequency for wireless antennas and for receiving/transmitting signals at wireless communication frequencies (e.g. quarter wavelength for monopole antennas); (2) the integrated antenna may also form a coil/loop at lower frequencies, such as wireless charging frequencies or NFC/RFID frequencies; and (3) the integrated antenna may also use one or more isolation circuits (e.g., a low-pass filter, a high-pass filter, and/or another type of filter) so that a frequency selective component/circuit is open (i.e., relatively high impedance) at wireless communication frequencies and is a closed loop/coil (i.e., relatively low impedance) at wireless charging/NFC/RFID frequencies. As an alternative solution, the same radiator (or HF antenna) may be used for wireless communication radios as well as for wireless charging and NFC/RFID, applying proper filtering at their terminals. Additionally, the circuit for the wireless charging/NFC/RFID coil/loop can be closed using parts of the device structure, such as chassis or PCB ground, and/or one or more dedicated wire connectors or other type of connectors. The examples discussed herein can be implemented in MIMO and diversity configurations. Examples are described in detail below with reference to FIGS. 1-7.

As used herein, the term "high-frequency (HF)" refers to signals communicated using one or more wireless communication frequencies, including cellular communications (at e.g., 704 MHz-960 MHz, 1710 MHz-2170 MHz, and 2496 MHz-2690 MHz), Wi-Fi communications (e.g., 2400 MHz-2480 MHz and 5170 MHz-5800 MHz), Bluetooth communications (e.g., 2.4 GHz-2.5 GHz), GPS communications (e.g., 1575 MHz), as well as any wireless communications at the VHF frequency range (e.g., 30-300 MHz) or the UHF frequency range (e.g., 300 MHz-3 GHz and 60 GHz). Other wireless communication standards may also be included in the above definition of HF.

As used herein, the term "low-frequency (LF)" refers to signals communicated at wireless charging (WC) frequencies (e.g., 100 KHz-205 KHz, 60 KHz-77.5 KHz, 277 KHz-357 KHz, 6.78 MHz, 13.56 MHz, and 27.095 MHz) as well as near-field communication (NFC) or radio frequency identification (RFID) frequencies (e.g., 13.56 MHz).

FIG. 1 is a block diagram illustrating a computing device using an integrated antenna with high-frequency elements, low-frequency elements, and isolation circuitry, in accordance with an example embodiment of the disclosure. Referring to FIG. 1, the computing device 100 may include a mobile communication device (e.g., a smart phone or a cellular phone), a laptop computer, a tablet, a desktop computer, or another type of computing device. The computing device 100 may comprise an integrated antenna 118, which may be coupled to one or more transceivers 120*a*, . . . , 120*n*, as well as to a wireless charging circuit 122 (and/or an NFC/RFID circuit, which is not illustrated in FIG. 1). The wireless charging circuit 122 may be used to charge the device battery 124 using wireless charging signals received from the wireless charging station 126. In instances when the device 100 comprises a NFC/RFID circuit, the integrated antenna 118 may be used to communicate with an NFC/RFID equipped device 128. The above components of device 100 may be coupled to the chassis 140. In an example embodiment, a printed circuit board (PCB) may be used in addition to (or in lieu of) the chassis 140.

The integrated antenna 118 may comprise one or more HF antennas 110*a*, . . . , 110*n* as well as one or more LF antennas 112*a*, . . . , 112*n*. The HF antennas 110*a*, . . . , 110*n* may be used for communicating signals to/from the transceivers 120*a*, . . . , 120*n* in one or more wireless communication frequencies (e.g., wireless communications 130). The LF antennas 112*a*, . . . , 112*n* may include one or more wireless charging loops/coils and/or one or more NFC/RFID loops/coils. Additionally, one or more of the HF antennas 110*a*, . . . , 110*n* may be used as part of one or more of the LF antennas 112*a*, . . . , 112*n*. In this regard, one or more of the LF antennas 112*a*, . . . , 112*n* may form a loop or coil by implementing at least one HF antenna as well as one or more isolation circuits coupled with a conductive material. Even though the same value n is used to indicate the upper limit of the number of HF antennas, LF antennas, HPFs and LPFs, the disclosure may not be limited in this regard and a different number n can be used for each of these elements (with the possibility of the upper limit of n being 1 for one or more of the HF antennas, LF antennas, HPFs and LPFs).

The isolation circuits may include one or more high-pass filter (HPFs) 114*a*, . . . , 114*n*, one or more low-pass filters (LPFs) 116*a*, . . . , 116*n*, and/or other filters or circuits. If an HF antenna is used as part of a LF antenna (e.g., as part of a wireless charging loop or coil), one or more isolation circuits may be used to isolate (or de-couple) a transceiver associated with the HF antenna in instances when the LF antenna is used for wireless charging. Similarly, one or more isolation circuits may be used to de-couple the wireless charging circuit 122 from the LF antenna in instances when signals at wireless communication frequencies are being processed by the transceiver associated with the HF antenna that is part of the wireless charging loop.

The conductive material may include the chassis 140 and/or one or more other conductors (e.g., coupling wires, traces, etc.). In some instances, the wireless charging circuit 122 and/or one or more of the HF antennas used as part of an LF antenna may be coupled to the conductive material using one or more of the isolation circuits so as to form a loop/coil for wireless charging (or NFC/RFID communications), where the loop/coil is isolated from other components/circuits while being coupled to the wireless charging circuit. Various implementations of the integrated antenna 118 are disclosed herein in reference to FIGS. 3-6.

In accordance with an example embodiment of the disclosure, the device chassis 140 may be used as an antenna or as a part of an antenna, such as one or more of the LF antennas 112*a*, . . . , 112*n* within the integrated antenna 118. As used in this application, the term "chassis" refers to a largely internal and largely structural portion of the computing device 100 that houses various electronic components of the device. The chassis 140 can include one or more layers of substrate and often also includes one or more ground planes that have low impedance. The chassis may include a substantial portion that forms part of the device structure. A transceiver can be connected to the chassis using a segment of coaxial cable or other transmission line in a way that provides an impedance match to the output of the transceiver (or amplifier or other component). RF components are typically designed with a 50 ohm output, but other impedances, such as 10 ohms and 75 ohms, are also possible. The transceiver then excites fundamental chassis modes to resonate the entire chassis or a portion of the chassis as an antenna. The connection can be established from the chassis to the metal radiating structure by means of a matching network in order to match the impedance of transceiver and structure.

The location at which the segment of transmission line is attached to the chassis to provide the desired impedance can be determined, for example, through simulation. The chassis attachment location that provides the desired impedance is also influenced by the length and the characteristic impedance of the transmission line used. The attachment point can be made adjustable to account for the effects of other device components and/or the limitations of simulations. For example, options to adjust impedance by up to 25% can be provided through a tuning patch, pad, or line. In some examples, multiple switchably-selectable tap points may be included along the length of the transmission line to allow matching at different impedances. In addition, lumped passive components such as inductors and capacitors can be used to provide matching from the transceiver to the chassis.

An antenna using the chassis 140 (e.g., one or more of the LF antennas 112*a*, . . . , 112*n*) can be used, for example, for wireless charging, radio frequency identification (RFID) or near-field communication (NFC) purposes. An antenna using the chassis can also operate, for example, at Bluetooth®, Wi-Fi®, and cellular frequencies.

Figure 2:
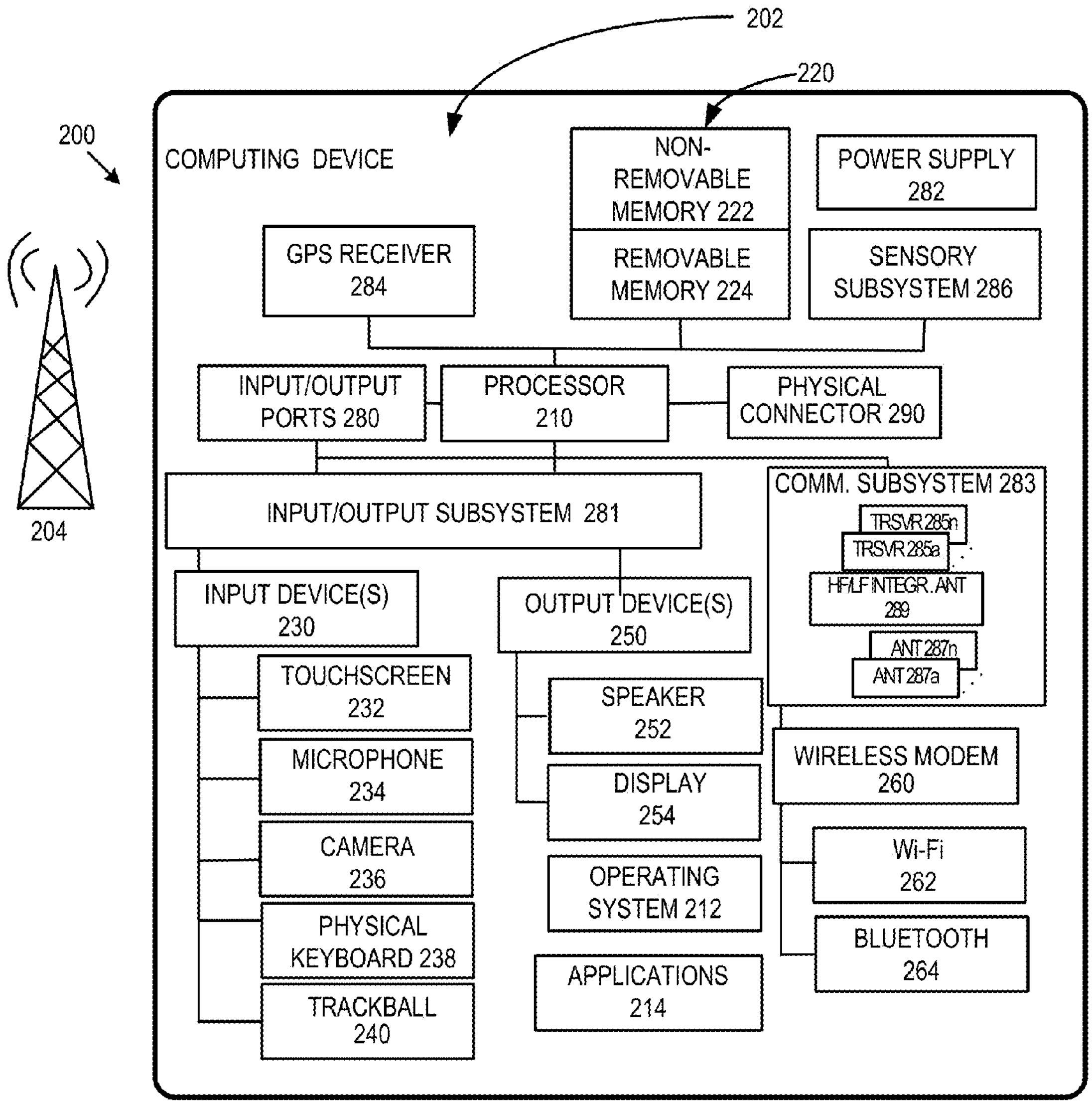
FIG. 2 is an example mobile device that can be used in conjunction with the technologies described herein.

FIG. 2 is an example mobile device that can be used in conjunction with the technologies described herein. An exemplary computing device including a variety of optional hardware and software components, is shown generally at 200. Any components 202 in the mobile device can communicate with any other component, although not all connections are shown, for ease of illustration. The device 200 can be any of a variety of computing devices (e.g., cell phone, smartphone, handheld computer, Personal Digital Assistant (PDA), etc.) and can allow wireless two-way communications with one or more mobile communications networks 204, such as a cellular or satellite network (or other types of communications such as wireless charging, NFC, and RFID type communications).

The illustrated device 200 can include a controller or processor 210 (e.g., signal processor, microprocessor, ASIC, FPGA, or other control and processing logic circuitry) for performing such tasks as signal coding, data processing, input/output processing, power control, and/or other functions. An operating system 212 can control the allocation and usage of the components 202 and support for one or more application programs 214. The application programs can include common mobile computing applications (e.g., email applications, calendars, contact managers, web browsers, messaging applications), or any other computing application.

The illustrated device 200 can include memory 220. Memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module (SIM) card, which is well known in GSM communication systems, or other well-known memory storage technologies, such as "smart cards." The memory 220 can be used for storing data and/or code for running the operating system 212 and the applications 214. Example data can include web pages, text, images, sound files, video data, or other data sets to be sent to and/or received from one or more network servers or other devices via one or more wired or wireless networks. The memory 220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The device 200 can support an input/output subsystem 281, which may comprise suitable logic, circuitry, interfaces, and/or code for enabling user interactions with the device 200, enabling obtaining input from user(s) and/or to providing output to the user(s). The I/O subsystem 281 may support various types of inputs (e.g., input devices 230) and/or outputs (e.g., output devices 250), including, for example, video, audio, and/or textual. In this regard, dedicated I/O devices and/or components, external to or integrated within the device 200 may be utilized for inputting and/or outputting data during operations of the I/O subsystem 281. Exemplary I/O devices may include one or more input devices 230, such as a touchscreen 232, microphone 234, camera 236, physical keyboard 238 and/or trackball 240, and one or more output devices 250, such as a speaker 252 and a display 254. Other possible output devices (not shown) can include piezoelectric or other haptic output devices.

Some devices can serve more than one input/output function. For example, touchscreen 1232 and display 254 can be combined in a single input/output device. The input devices 230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 212 or applications 214 can comprise speech-recognition software as part of a voice user interface that allows a user to operate the device 200 via voice commands. Further, the device 200 can comprise input devices and software that allows for user interaction via a user's spatial gestures, such as detecting and interpreting gestures to provide input to a gaming application.

The communication subsystem 283 may comprise suitable logic, circuitry, interfaces, and/or code operable to communicate data from and/or to the computing device, such as via one or more wired and/or wireless connections. The communication subsystem 283 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the device 200, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation.

In accordance with an embodiment of the disclosure, the communication subsystem 283 may provide wireless connections associated with, for example, signals at wireless charging frequencies and/or NFC/RFID signals. In this regard, the communication subsystem 283 may comprise transceivers 285*a*, . . . , 285*n* which may support HF and/or LF communications using corresponding antennas 287*a*, . . . , 287*n*. Additionally, the communication subsystem 283 may comprise an integrated antenna 289, which may combine one or more HF and LF antennas as described in reference to FIGS. 1 and 3-6, so as to enable use of one or more HF antennas in a wireless charging loop/coil for receiving wireless charging signals (or NFC/RFID signals).

A wireless modem 260 can be coupled to an antenna (e.g., 289, 287*a*, . . . , 287*n*) and can support two-way communications between the processor 210 and external devices, as is well understood in the art. The modem 260 is shown generically and can include a cellular modem for communicating with the mobile communication network 204 and/or other radio-based modems (e.g., Bluetooth 264 or Wi-Fi 262). The wireless modem 1460 is typically configured for communication with one or more cellular networks, such as a GSM network for data and voice communications within a single cellular network, between cellular networks, or between the mobile device and a public switched telephone network (PSTN).

The mobile device can further include at least one input/output port 280, a power supply 282, a satellite navigation system receiver 284, such as a Global Positioning System (GPS) receiver, a sensory subsystem 286, and/or a physical connector 290, which can be a USB port, IEEE 1394 (FireWire) port, and/or RS-232 port.

The sensory subsystems 286 may comprise suitable logic, circuitry, interfaces, and/or code for obtaining and/or generating sensory information, which may relate to the device 200, its user(s), and/or its environment. For example, the sensory subsystems 286 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters). The illustrated components 202 are not required or all-inclusive, as any components can be deleted and other components can be added.

Figure 3:
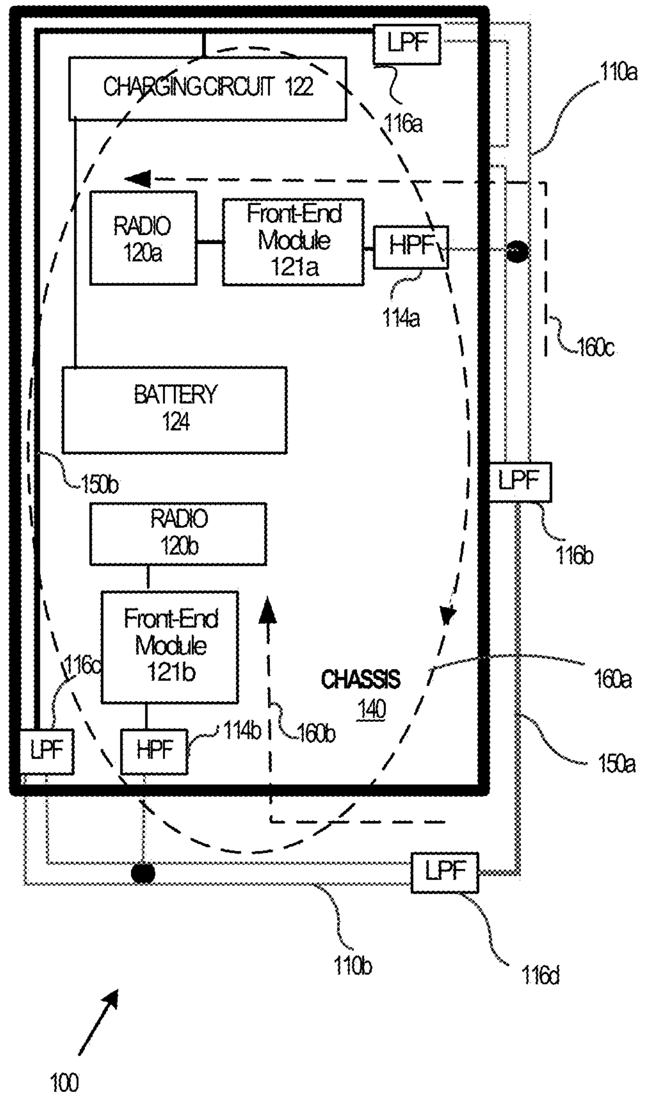
FIG. 3 is a block diagram illustrating an example of combined high-frequency antenna and a wireless charging/NFC/RFID coil, in accordance with an example embodiment of the disclosure.

FIG. 3 is a block diagram illustrating an example of combined high-frequency antenna and a wireless charging/NFC/RFID coil, in accordance with an example embodiment of the disclosure. Referring to FIG. 3, the computing device 100 may comprise chassis 140, radios (e.g., transceivers) 120*a*-120*b*, front-end modules 121*a*-121*b*, antennas (e.g., HF antennas) 110*a*-110*b*, a wireless charging circuit 122, and a battery 124.

The antennas 110*a*-110*b* may be wireless communication antennas configured to transmit and receive signals in one or more wireless communication frequencies. Additional conductor 150*a* is connected between wireless communication antennas 110*a* and 110*b* via LPFs 116*b*, 116*d*, and additional conductor 150*b* is connected between wireless communication antennas 110*a*-110*b* via LPFs 116*a*, 116*c*. Wireless charging circuit 122 controls wireless charging for the battery 124. The radio 120*a* and front-end module 121*a* may be de-coupled from any wireless charging signals by HPF 114*a*. Similarly, the radio 120*b* and front-end module 121*b* may be de-coupled from any wireless charging signals by HPF 114*b*.

At low frequencies above those blocked by HPFs 114*a*-114*b* and below those blocked by LPFs 116*a*-116*d*, a wireless charging coil/loop is formed from wireless communication antenna 110*a*, additional conductor 150*a*, wireless communication antenna 110*b*, and additional conductor 150*b*. The antenna or antennas that form part of the wireless charging coil can be isolated from the conductor that forms the remainder of the coil using the LPFs 116*a*-116*d*, which may include one or more inductors or other types of notch filters. The impedance of the inductors increases with frequency, tending to reduce electrical coupling between the antennas and the remainder of the charging coil at wireless communication frequencies. High-pass filters (HPFs) 114*a*-114*b*, which may include one or more capacitors or another type of filters, can be used to isolate (or de-couple) the transceiver radios (e.g., 120*a*, 120*b*) from the wireless charging circuitry 122 and the wireless charging loop when wireless charging signals are being processed.

The wireless charging/NFC current flow is illustrated in FIG. 3 as 160*a*. In instances when the HF antennas 110*a*-110*b* are used for communicating signals at wireless communication frequencies to and from the radios 120*a*-120*b*, the wireless signal path (e.g., reception path) for each corresponding radio 120*a*-120*b* is indicated as 160*c* and 160*b*, respectively.

Component values (e.g., inductance, capacitance, and/or filter frequencies) for LPFs 116*a*-116*d* and HPFs 114*a*-114*b* may be selected to block or allow desired frequencies. Battery 124 and wireless charging circuit 122 can be connected to the charging coil/loop in a variety of ways. The charging coil/loop can also be formed from various alternative/additional conductors (not shown) on chassis 140. Even though a wireless charging circuit 122 is illustrated in FIG. 3, the disclosure is not limited in this regard and the block 122 may be a NFC/RFID circuit, which may use the loop/coil discussed above for purposes of communicating with an NFC/RFID-enabled device.

Figure 4:
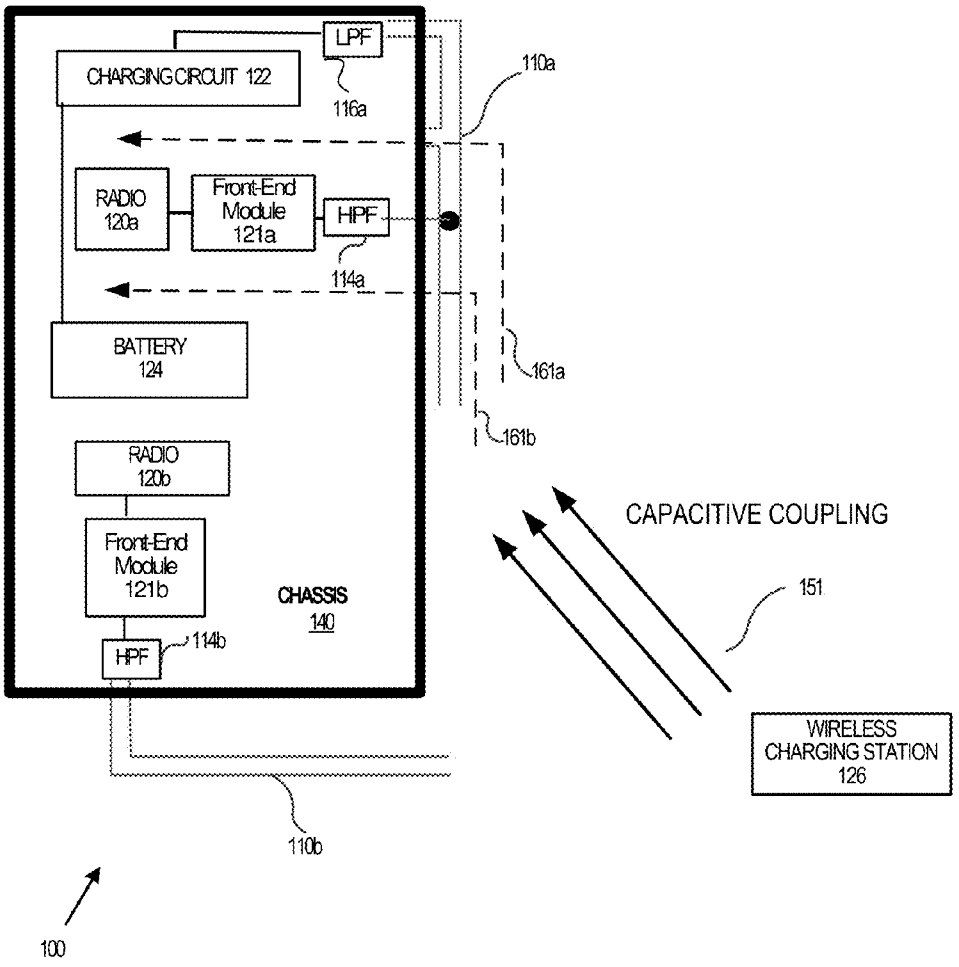
FIG. 4 is a block diagram illustrating an example of a high-frequency antenna used for wireless charging via capacitive coupling, in accordance with an example embodiment of the disclosure.

FIG. 4 is a block diagram illustrating an example of a high-frequency antenna used for wireless charging via capacitive coupling, in accordance with an example embodiment of the disclosure. Referring to FIG. 4, the computing device 100 may comprise chassis 140, radios (e.g., transceivers) 120*a*-120*b*, front-end modules 121*a*-121*b*, antennas (e.g., HF antennas) 110*a*-110*b*, a wireless charging circuit 122, and a battery 124.

In an example embodiment, the HF antenna 110*a* may be used for both wireless charging signal communication as well as communicating signals at various wireless frequencies. In instances when the wireless charging station 126 provides wireless charging capabilities via capacitive coupling (e.g., 151), the antenna 110*a* may be coupled to the charging circuit 122 via the LPF 116*a* so that wireless charging signals via the capacitive coupling 151 may be received by the charging circuit 122. The communication path of the wireless charging signals received by the charging circuit 122 via the capacitive coupling 151 is indicated as 161*a* in FIG. 4.

In instances when wireless charging signals are being received, the radio 120 may be de-coupled from the antenna 110*a* via the HPF 114*a*. In instances when the antenna 110*a* is used for communicating signals at wireless communication frequencies, such signals may pass through the HPF 114*a* but may be blocked by the LPF 116*a*, thereby de-coupling the wireless charging circuit 122 when wireless communication signals are being received/transmitted by the radio 120*a*. The communication path of the wireless communication signals (e.g., reception) is indicated as 161*b* in FIG. 4.

Figure 5:
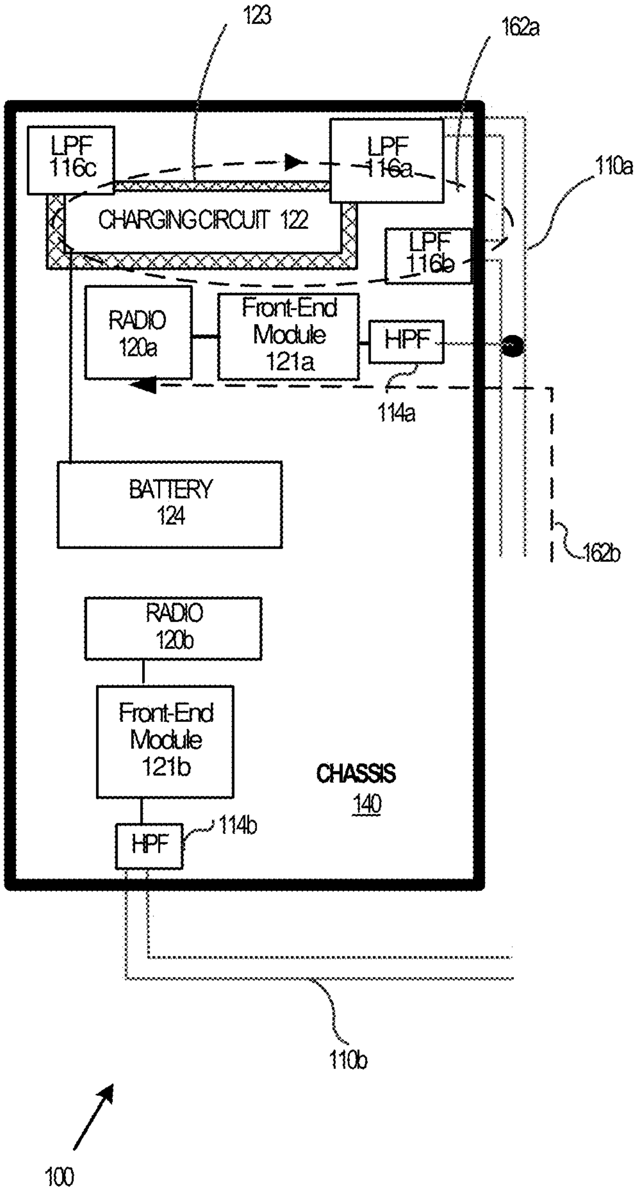
FIG. 5 is a block diagram illustrating another example of combined high-frequency antenna and a wireless charging/NFC/RFID coil, in accordance with an example embodiment of the disclosure.

FIG. 5 is a block diagram illustrating another example of combined high-frequency antenna and a wireless charging/NFC/RFID coil, in accordance with an example embodiment of the disclosure. The charging circuit 122 may be isolated from the chassis 140 via an isolation layer 123, and the charging circuit 122 may be coupled to the chassis via the LPFs 116*c* and 116*a*, allowing for the formation of a wireless charging loop/coil.

In an example embodiment, the HF antenna 110*a* may be used for both wireless charging signal communication as well as communicating signals at various wireless frequencies. In instances when the wireless charging station 126 provides wireless charging capabilities via inductive coupling, the antenna 110*a* may be used in forming a wireless charging loop/coil for inductively coupling with the charging station. More specifically, the HF antenna can be coupled to the chassis 140 and to the charging circuit 122 via the LPFs 116*b* and 116*a*, respectively. Additionally, the wireless charging circuit 122 (which is isolated from the chassis 140 via the isolation layer 123) may be coupled to chassis 140 via LPF 116*c* and LPF 116*a*, thereby forming a wireless charging loop that includes the antenna 110*a* (e.g., the portion between LPF 116*a* and 116*b*), LPFs 116*a*-116*c*, and the charging circuit 122. The communication path of the wireless charging signals received by the charging circuit 122 along the wireless charging loop is indicated as 162*a* in FIG. 5.

In instances when wireless charging signals are being received, the radio 120 may be de-coupled from the antenna 110*a* via the HPF 114*a*. In instances when the antenna 110*a* is used for communicating signals at wireless communication frequencies, such signals may pass through the HPF 114*a* but may be blocked by the LPF 116*a*, thereby de-coupling the wireless charging circuit 122 when wireless communication signals are being received/transmitted by the radio 120*a*. The communication path of the wireless communication signals (e.g., reception) is indicated as 162*b* in FIG. 5.

Figure 6:
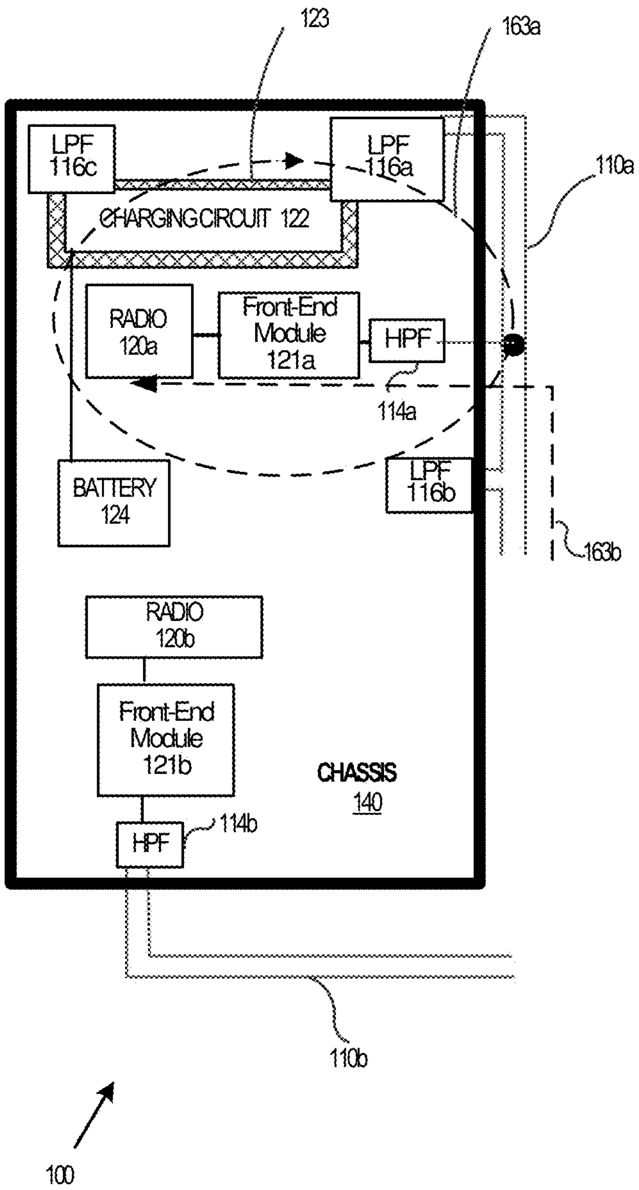
FIG. 6 is a block diagram illustrating another example of combined high-frequency antenna and a wireless charging/NFC/RFID coil, in accordance with an example embodiment of the disclosure.

FIG. 6 is a block diagram illustrating another example of combined high-frequency antenna and a wireless charging/NFC/RFID coil, in accordance with an example embodiment of the disclosure. FIG. 6 is similar in many respects to FIG. 5, with the exception that the LPF 116*b* coupling the antenna 110*a* to the chassis 140 has a different location on the chassis 140 (i.e., LPF 116*b* is now located below the HPF 114*a*). In this regard, the resulting current flow for the formed wireless charging loop has a larger path, which is indicated as 163*a* in FIG. 5.

In instances when wireless charging signals are being received, the radio 120 may be de-coupled from the antenna 110*a* via the HPF 114*a*. In instances when the antenna 110*a* is used for communicating signals at wireless communication frequencies, such signals may pass through the HPF 114*a* but may be blocked by the LPF 116*a*, thereby de-coupling the wireless charging circuit 122 when wireless communication signals are being received/transmitted by the radio 120*a*. The communication path of the wireless communication signals (e.g., reception) is indicated as 163*b* in FIG. 6.

In accordance with an example embodiment of the disclosure, the technologies described herein may allow for the simultaneous reception of wireless charging signals as well as signals at wireless communication frequencies. For example and in reference to FIGS. 5-6, signals at wireless communication frequencies may be received by the HF antenna 110*a* and may pass through the HPF 114*a* for processing by the radio 120*a* (similar path may be used for transmitted wireless signals from the radio 120*a*). Simultaneously, wireless charging signals may be received by the HF antenna 110*a*, which signals are blocked by the HPF 114*a* but are allowed to pass through by the LPFs 116*a*-116*c* and reach the wireless charging circuit via the wireless charging loop (as explained above).

In accordance with an example embodiment of the disclosure, an integrated antenna (118) for receiving signals for a plurality of functional modules (e.g., 120*a*-120*n*) in a computing device may include a first plurality of antenna elements (e.g., 110*a*, . . . , 110*n*) for receiving signals at wireless communication frequencies and a second plurality of antenna elements (e.g., 112*a*, . . . , 112*n*) for receiving signals at wireless charging frequencies. The first and the second pluralities of antenna elements may have at least one common antenna element (e.g., 110*a* may be used as both an HF antenna and for receiving wireless charging signals in a loop/coil). The at least one common antenna element (e.g., 110*a*) may be coupled to one or more of the second plurality of antenna elements (e.g., 110*b*) using at least one low-pass filter (e.g., 116*b*, 116*d*). The at least one common antenna element (e.g., 110*a*) may be de-coupled from one or more of the plurality of functional modules (e.g., 120*a*) operating at the wireless communication frequencies using at least one high-pass filter (e.g., 114*a*).

The at least one low-pass filter (e.g., 116*a*-116*d*) may include a filter configured to filter the signals at wireless communication frequencies. The at least one high-pass filter (e.g., 114*a*-114*b*) may include a filter configured to filter the signals at wireless charging frequencies. The signals at wireless communication frequencies may include one or more of cellular signals, Bluetooth signals, Wi-Fi signals, and GPS signals. The at least one common antenna element (e.g., 110*a*) and the one or more of the second plurality of antenna elements (e.g., 110*b*, 150*a*, 150*b*) may form a wireless charging loop or a wireless charging coil for receiving the signals at wireless charging frequencies.

The at least one common antenna element (e.g., 110*a*) may be communicatively coupled to at least one of the plurality of functional modules (e.g., 122) operating at the wireless charging frequencies using the at least one low-pass filter (e.g., 116*a*). The at least one common antenna element (e.g., 110*a*) may be configured to receive the signals at the wireless charging frequencies using one of inductive signal coupling or a capacitive signal coupling. At least one of the plurality of functional modules (e.g., 120*a*-120*n*) may include a near-field communication (NFC) module for receiving NFC signals. At least a portion of the second plurality of antenna elements (112*a*, . . . , 112*n*) may form a NFC loop or a NFC coil for receiving the NFC signals.

In accordance with another example embodiment of the disclosure, a mobile device (e.g., 100) may include a plurality of high-frequency antennas (e.g., 110*a*-110*n*) configured to receive signals at wireless communication frequencies; conductive material (e.g., 150*a*-150*b*) coupled to at least two of the plurality of high-frequency antennas (e.g., 110*a*, 110*b*) to form a low-frequency antenna configured to receive signals at wireless charging frequencies or near-field communication (NFC) frequencies; and isolation circuitry (e.g., LPFs 116*a*-116*n* and HPFs 114*a*-114*n*). The isolation circuitry may be configured to de-couple the conductive material from one or more wireless communication transceivers coupled to the at least two of the plurality of high-frequency antennas at wireless communication frequencies (e.g., LPFs 116*a*-116*d* are used to de-couple one or more portions of the wireless charging loop (e.g., 150*a*-150*b*) as illustrated in FIG. 3, when wireless communication signals are being received/transmitted by one or more of the HF antennas 110*a*-110*b*). The isolation circuitry may be also configured to couple the conductive material (e.g., 150*a*-150*b*) to the at least two of the plurality of high-frequency antennas (e.g., 110*a*-110*b*) at wireless charging frequencies.

The conductive material coupled to the at least two of the plurality of high-frequency antennas may form a NFC loop or a NFC coil. The device 100 may also include a battery 124 and a wireless charging circuit 122 coupled to the battery. The conductive material may be coupled to the at least two of the plurality of high-frequency antennas (e.g., 110*a*-110*b*) to form a wireless charging loop. The wireless charging loop may be configured to inductively couple with an alternating magnetic field using contactless electromagnetic induction (e.g., from charging station 126) to generate a corresponding induced electromagnetic current in the wireless charging circuit for charging the battery 124. At least a portion of the wireless charging loop (e.g., 110*a*) may be configured to capacitively couple (e.g., 151) with the alternating magnetic field to generate the corresponding induced electromagnetic current. The isolation circuitry (e.g., HPFs 114*a*-114*n* and LPS 116*a*-116*n*) may include one or more of at least one capacitor, at least one inductor, and at least one filter. The device 100 may also include a chassis 100, where at least a portion of the conductive material comprises the chassis (e.g., as illustrated by the wireless charging loops in FIGS. 5-6).

In accordance with an example embodiment of the disclosure, a computing device 100 may include a chassis 140, at least one high-frequency antenna (e.g., 110*a*-110*n*) configured to receive signals at wireless communication frequencies. The at least one high-frequency antenna (e.g., 110*a* in FIG. 5) may be coupled to the chassis via a first filter (e.g., LPF 116*b*). The device 100 may include a wireless charging circuit (122) configured to charge a battery (124) of the device 100 using signals at wireless charging frequencies. The wireless charging circuit may be coupled to the chassis via a second filter (e.g., 116*c*). The at least one high-frequency antenna (e.g., 110*a*) may be coupled to the wireless charging circuit 122 via a third filter (e.g., LPF 116*a*). The chassis (140), at least a portion of the at least one high-frequency antenna (e.g., 110*a* or a portion of 110*a* between LPFs 116*a*-116*b*), and the first, second and third filters (116*a*-116*c*) may form a wireless charging loop configured to receive the signals at wireless charging frequencies.

The device 100 may include at least one high-frequency transceiver (e.g., 120*a*) coupled to the chassis 140 and the at least one high-frequency antenna (110*a*), the at least one high-frequency transceiver configured to process the signals at wireless communication frequencies. The device 100 may also include a fourth filter (e.g., HPF 114*a*) configured to couple the at least one high-frequency transceiver (e.g., 120*a*) to the at least one high-frequency antenna (e.g., 110*a*) for receiving the signals at wireless communication frequencies, and de-couple the at least one high-frequency transceiver from the wireless charging loop when receiving the signals at wireless charging frequencies.

The first, second and third filters (e.g., LPFs 116*a*-116*c*) may be bandpass filters (or another type of filters), and may be configured to couple the wireless charging circuit (122) to the wireless charging loop when the device 100 is receiving the signals at wireless charging frequencies, and de-couple the wireless charging circuit (122) from the at least one high-frequency antenna (e.g., 110*a*) when the device 100 is receiving the signals at wireless communication frequencies. The at least a portion of the at least one high-frequency antenna (e.g., 110*a*) forming the wireless charging loop may be disposed between the first and third filters (e.g., between LPFs 116*b* and 116*a*).

The wireless charging loop may be configured to one of inductively or capacitively couple with an alternating magnetic field using contactless electromagnetic induction to generate a corresponding induced electromagnetic current in the wireless charging circuit for charging the battery (e.g., capacitive or inductive coupling with the wireless charging station 126). The device 100 may also include a near-field communication (NFC) circuit configured to process NFC signals, the NFC circuit coupled to the chassis and the at least one high-frequency antenna via isolation circuitry (e.g., one or more of the LPFs 116*a*-116*n* and/or the HPFs 114*a*-114*n*). The isolation circuitry may de-couple the NFC circuit from the at least one high-frequency antenna (e.g., one or more of 110*a*-110*n*) when receiving the signals at wireless communication frequencies. The chassis, the at least one high-frequency antenna (e.g., 110*a*-110*b*), and the isolation circuitry (e.g., LPFs 116*a*-116*d*) may form a NFC loop or NFC coil configured to receive the NFC signals.

In accordance with an example embodiment of the disclosure, a wireless charging loop may be formed by a single HF antenna coupled to a single LF antenna. For example and in reference to FIG. 6, a wireless charging loop may be formed by the HF antenna 110*a*, which may be coupled to the chassis 140 (or to another conductor) only via the LPF 116*a*, thereby forming a wireless charging loop using the chassis 140.

Figure 7:
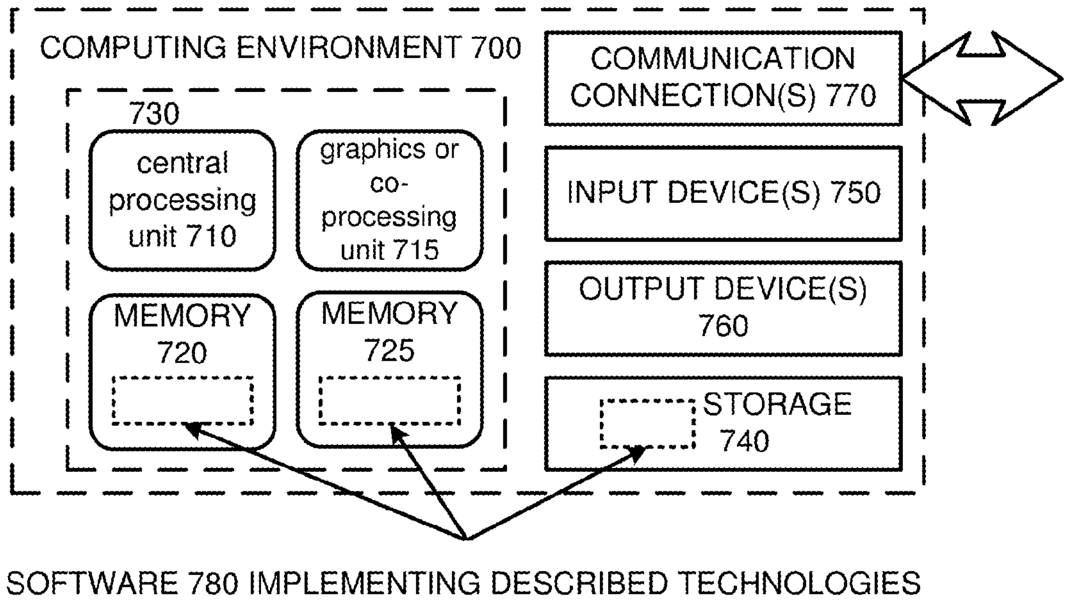
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, media player, gaming system, mobile device, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). Some example innovations that may be implemented in software 780 may include activating and/or deactivating one or more of the HPFs and/or LPFs based on the type of signal being communicated (i.e., activate a wireless charging loop when wireless charging signals are detected, or de-couple one or more elements from the wireless charging loop if wireless signals are being communicated by one or more HF antennas that are part of the wireless charging coil/loop).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. For video encoding, the input device(s) 750 may be a camera, video card, TV tuner card, or similar device that accepts video input in analog or digital form, or a CD-ROM or CD-RW that reads video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. An integrated antenna for transmitting and/or receiving signals for a plurality of functional modules in a computing device, the integrated antenna comprising:

a high-frequency antenna capable of receiving signals at wireless communication frequencies; and additional conductive material, wherein the high-frequency antenna and additional conductive material together form a low-frequency antenna capable of receiving signals at one of wireless charging frequencies or NFC/RFID frequencies, wherein the high-frequency antenna is coupled to the additional conductive material through at least one low-pass filter such that at wireless communication frequencies, the low-pass filter acts as an open circuit and separates the additional conductive material from the high-frequency antenna, and wherein the high-frequency antenna is coupled to one or more of the plurality of functional modules through a high-pass filter such that at wireless communication frequencies, the high-pass filter acts as a short circuit and connects the one or more of the plurality of functional modules with the high-frequency antenna.

2. The integrated antenna according to claim 1, wherein the at least one low-pass filter acts as a short circuit at wireless charging frequencies and NFC/RFID frequencies, connecting the high-frequency antenna and the additional conductive material.

3. The integrated antenna according to claim 1, wherein the at least one high-pass filter acts as an open circuit at wireless charging frequencies and NFC/RFID frequencies, disconnecting the one or more functional modules from the low-frequency antenna.

4. The integrated antenna according to claim 1, wherein the signals at wireless communication frequencies comprise one or more of cellular signals, Bluetooth signals, Wi-Fi signals, or GPS signals.

5. The integrated antenna according to claim 1, wherein the high-frequency antenna and the additional conductive material form a wireless charging loop or a wireless charging coil for transmitting and/or receiving the signals at wireless charging frequencies.

6. The integrated antenna according to claim 1, wherein:

the low-frequency antenna is configured to receive the signals at the wireless charging frequencies using one of inductive signal coupling or a capacitive signal coupling.

7. The integrated antenna according to claim 1, wherein:

at least one of the plurality of functional modules comprises a near-field communication (NFC) module for receiving NFC signals; and the high-frequency antenna and the additional conductive material form an NFC loop or an NFC coil for receiving the NFC signals.

8. A wireless device, comprising:

a plurality of high-frequency antennas configured to receive signals at wireless communication frequencies;

conductive material coupled to at least two of the plurality of high-frequency antennas to form a low-frequency antenna configured to receive signals at wireless charging frequencies or near-field communication (NFC) frequencies; and isolation circuitry that is configured to:

de-couple the conductive material from one or more wireless communication transceivers coupled to the at least two of the plurality of high-frequency antennas at wireless communication frequencies; and couple the conductive material to the at least two of the plurality of high-frequency antennas at wireless charging frequencies.

9. The wireless device of claim 8, wherein the conductive material coupled to the at least two of the plurality of high-frequency antennas forms an NFC loop or an NFC coil.

10. The wireless device of claim 8, further comprising:

a battery; and a wireless charging circuit coupled to the battery, wherein:

the conductive material coupled to the at least two of the plurality of high-frequency antennas forms a wireless charging loop; and the wireless charging loop is configured to inductively couple with an alternating magnetic field using contactless electromagnetic induction to generate a corresponding induced electromagnetic current in the wireless charging circuit for charging the battery.

11. The wireless device of claim 10, wherein at least a portion of the wireless charging loop is configured to capacitively couple with the alternating magnetic field to generate the corresponding induced electromagnetic current.

12. The wireless device of claim 8, wherein the isolation circuitry comprises one or more of at least one capacitor, at least one inductor, or at least one filter.

13. The wireless device of claim 8, further comprising a chassis, wherein at least a portion of the conductive material comprises the chassis.

14. A wireless device, comprising:

a chassis;

at least one high-frequency antenna configured to receive signals at wireless communication frequencies, the at least one high-frequency antenna coupled to the chassis via a first filter; and a wireless charging circuit configured to charge a battery of the wireless device using signals at wireless charging frequencies, wherein:

the wireless charging circuit is coupled to the chassis via a second filter;

the at least one high-frequency antenna is coupled to the wireless charging circuit and to the chassis via a third filter; and the chassis, at least a portion of the at least one high-frequency antenna, and the first, second and third filters form a wireless charging loop configured to receive the signals at wireless charging frequencies.

15. The wireless device of claim 14, wherein the wireless charging circuit is mounted on an isolation layer, and the device further comprises:

at least one high-frequency transceiver coupled to the chassis and the at least one high-frequency antenna, the at least one high-frequency transceiver configured to process the signals at wireless communication frequencies.

16. The wireless device of claim 15, comprising:

a fourth filter configured to:

couple the at least one high-frequency transceiver to the at least one high-frequency antenna for receiving the signals at wireless communication frequencies; and de-couple the at least one high-frequency transceiver from the wireless charging loop when receiving the signals at wireless charging frequencies.

17. The wireless device of claim 14, wherein the first, second and third filters are configured to:

couple the wireless charging circuit to the wireless charging loop when the mobile device is receiving the signals at wireless charging frequencies; and de-couple the wireless charging circuit from the at least one high-frequency antenna when the mobile device is receiving the signals at wireless communication frequencies.

18. The wireless device of claim 14, wherein the at least a portion of the at least one high-frequency antenna forming the wireless charging loop is disposed between the first and third filters.

19. The wireless device of claim 14, wherein the wireless charging loop is configured to one of inductively or capacitively couple with an alternating magnetic field using contactless electromagnetic induction to generate a corresponding induced electromagnetic current in the wireless charging circuit for charging the battery.

20. The wireless device of claim 14, further comprising:

a near-field communication (NFC) circuit configured to process NFC signals, the NFC circuit coupled to the chassis and the at least one high-frequency antenna via isolation circuitry, wherein:

the isolation circuitry de-couples the NFC circuit from the at least one high-frequency antenna when receiving the signals at wireless communication frequencies; and the chassis, the at least one high-frequency antenna, and the isolation circuitry form an NFC loop or NFC coil configured to receive the NFC signals.

* * * * *